United States Patent
Nagata

(10) Patent No.: US 7,444,755 B2
(45) Date of Patent: Nov. 4, 2008

(54) TELESCOPIC SYSTEM WITH DIGITAL COMPASS

(75) Inventor: Koichi Nagata, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 73 days.

(21) Appl. No.: 11/392,833

(22) Filed: Mar. 30, 2006

(65) Prior Publication Data

US 2006/0248736 A1     Nov. 9, 2006

(30) Foreign Application Priority Data

Mar. 31, 2005   (JP)   ............ P.2005-102342

(51) Int. Cl.
*G01C 17/18*   (2006.01)
(52) U.S. Cl. ....................................... 33/334
(58) Field of Classification Search ............. 33/334
See application file for complete search history.

(56) References Cited

U.S. PATENT DOCUMENTS

| | | | | |
|---|---|---|---|---|
| 4,250,626 A | * | 2/1981 | Lazar | ............ 33/355 R |
| 4,402,140 A | * | 9/1983 | Nagae | ............ 33/334 |
| 4,577,414 A | * | 3/1986 | Migliori et al. | ............ 33/363 K |
| 5,670,780 A | | 9/1997 | Lewis | |
| 5,752,322 A | * | 5/1998 | Lewis | ............ 33/355 R |
| 6,366,212 B1 | * | 4/2002 | Lemp | ............ 33/268 |
| 6,493,953 B1 | * | 12/2002 | Rogers | ............ 33/355 R |

FOREIGN PATENT DOCUMENTS

| | | |
|---|---|---|
| CN | 2646730 Y | 10/2004 |
| JP | 2001-13420 A | 1/2001 |
| JP | 2002-221670 A | 8/2002 |

* cited by examiner

*Primary Examiner*—Christopher W Fulton
(74) *Attorney, Agent, or Firm*—Birch, Stewart, Kolasch & Birch, LLP

(57) ABSTRACT

A telescopic system is provided and has a digital compass and a gimbal mechanism. The gimbal mechanism is formed of first and second gimbal suspension members and a base table side supporting member. The digital compass is held placed on the gimbal mechanism. The first gimbal suspension member has two crossing arm portions and is suspended on the base table side supporting member rotatably on the first rotary shafts. The second gimbal suspension member is suspended on the first gimbal suspension member rotatably on the second rotary shafts. In this arrangement, the digital compass can be always kept horizontal even when the gimbal mechanism is tilted.

1 Claim, 6 Drawing Sheets

TELESCOPIC SYSTEM WITH DIGITAL COMPASS

FIELD OF THE INVENTION

The present invention relates to a telescope such as binocular and monocle (hereinafter referred to as "binocular, etc." for viewing an object to be observed such as scene and material in an enlarged picture and more particularly to a telescopic system with digital compass capable of informing direction while observation or the like is being effected.

BACKGROUND OF THE INVENTION

Various telescopic systems arranged so as to inform direction data while scene or the like is being observed have been proposed from the standpoint of improvement of convenience thereof for example. For example, telescopic systems comprising a magnet plate provided in a liquid such as oil arranged such that the magnet plate can be viewed in the field of view using an optical system have been known (JP-A-2001-13420).

Further, telescopic systems capable of displaying direction data obtained by a magnetic sensor in the field of view and informing the angular deviation from the line of sight detected by a tilt sensor provided therein have been known (JP-A-2002-221670).

However, the former of the aforementioned related art examples, i.e., structure having a magnet plate disposed in a liquid is disadvantageous in that when the binocular is tilted with respect to the horizontal position, the magnet plate, too, is tilted according to the deviation, making it difficult for letters indicating direction to be viewed as compared with the case where the magnet plate is viewed from the front.

This problem will be further described hereinafter in connection with FIGS. 10 and 11 with reference to a binocular having a compass provided with a magnetic plate similarly to the binocular disclosed in JP-A-2001-13420, though somewhat different in structure, by way of example. The compass portion of the binocular shown in FIG. 10 has a magnet plate 51 received in a liquid such as oil as in the binocular disclosed in the above cited patents. The magnet plate 51 is disposed on the optical axis L extending between a relay lens 52 for introducing light flux into the ocular of the main body of the binocular and a light window 53. In this arrangement, the direction indicated on the magnet plate 51 can be viewed while observing scene, etc. FIG. 10 depicts the state in which the binocular is kept horizontal and the optical axis L is kept vertical. The magnet plate 51 is disposed along the horizontal direction. In this state, the magnet plate 51 can be viewed from the front in the field of view, making it possible to read the direction without being out of focus.

On the other hand, when the binocular is tilted with respect to the horizontal direction and the optical axis L is tilted with respect to the vertical direction as shown in FIG. 11, the magnet plate 51 in the liquid changes in its position such that it is disposed along the horizontal direction. As a result, the magnet plate 51 is tilted with respect to the direction perpendicular to the optical axis L. This causes the magnet plate 51 to be viewed obliquely. Therefore, the direction must be viewed out of focus, making it difficult to read accurate direction immediately to disadvantage.

On the contrary, the related art binocular disclosed in the above cited JP-A-2002-221670 comprising a magnetic sensor is adapted to electrically process the output signal from the magnetic sensor and display it in the field of view. Thus, this system doesn't cause the display to be viewed out of focus as in the former citation. However, since this magnetic sensor, too, requires that it be used while being kept horizontal, some error in direction occurs when the binocular is tilted with respect to the horizontal direction. Such erroneous direction data need to be corrected.

In order to correct the erroneous direction data, the tilt of the binocular with respect to the horizontal position needs to be known. To this end, a tilt sensor is needed. At the same time, it is necessary that the structure for mounting the tilt sensor be taken in account. This complicates the structure of the binocular. Further, the complicated correction process adds to product price.

SUMMARY OF THE INVENTION

An object of an illustrative, non-limiting embodiment of the invention is to provide a telescopic system with digital compass, which can prevent the occurrence of error in direction and make accurate direction known by a relatively simple constitution without necessitating any sensor for correcting for error in direction caused by the tilt of the main body thereof or any complicated correction process.

A telescopic system with digital compass according to an exemplary embodiment of the invention comprises a digital compass and can display a direction obtained by the digital compass on a display unit, wherein the digital compass is held placed on a gimbal suspension unit of a gimbal mechanism.

The aforementioned gimbal mechanism preferably comprises: a first gimbal suspension member which is suspended on a member fixed to a telescopic system housing in such an arrangement that it can rotate on a first rotary shaft; and a second gimbal suspension member which is suspended on the first gimbal suspension member in such an arrangement that it can rotate on a second rotary shaft disposed perpendicular to the first rotary shaft.

Further, the aforementioned digital compass is held placed on the second gimbal suspension member.

In accordance with an exemplary embodiment of the telescopic system with digital compass of the invention, a digital compass which can cause some error in output data when affected by the tilt can be always kept horizontal by a gimbal mechanism regardless of the tilt of the telescopic system, making it possible to prevent the occurrence of error in data and inform accurate direction certainly. Further, since this can be realized by a relatively simple mechanism, an inexpensive telescopic system with digital compass having a high reliability can be obtained.

DETAILED DESCRIPTION OF THE INVENTION

A telescopic system with digital compass according to an exemplary embodiment of the invention will be described in connection with the attached drawings.

Figure 1:
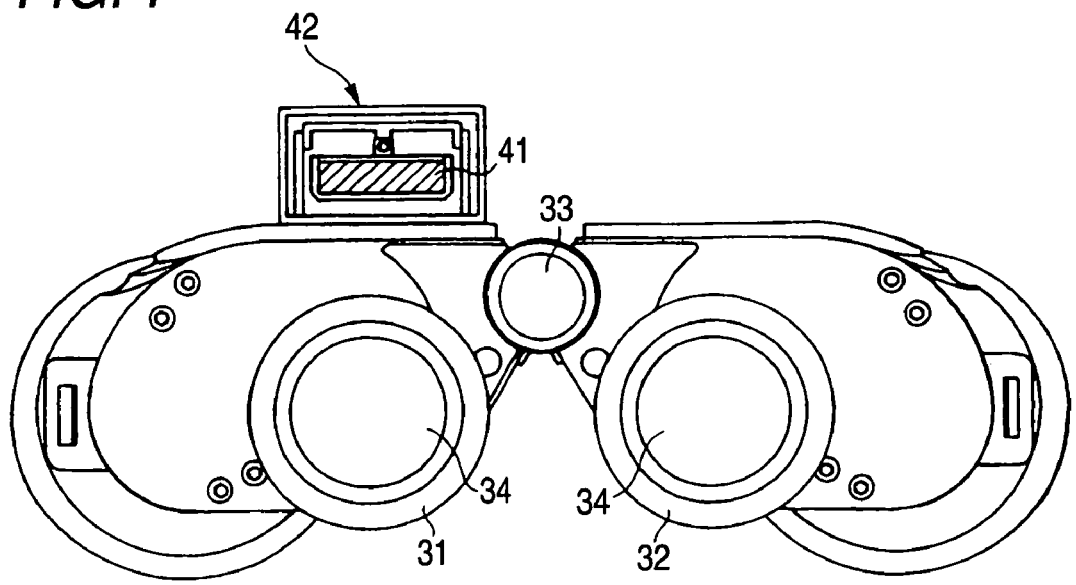
FIG. 1 is a side view of a telescopic system with digital compass according to an exemplary embodiment of the invention.

Firstly, the entire configuration of the telescopic system with digital compass according to an exemplary embodiment of the invention will be described in connection with FIG. 1.

A telescopic system with digital compass according to the present embodiment comprises a left lens tube 31 and a right lens tube 32 connected to each other with an axis portion 33 interposed therebetween and is arranged such that the left lens tube 31 and the right lens tube 32 can swing on the axis portion 33 as a center to adjust the distance between the left lens tube 31 and the right lens tube 32 to some extent. Such an arrangement is essentially the same as that of the related art binoculars. FIG. 1 is a side view of the telescopic system with digital compass as viewed from the ocular 34 side thereof.

In the present embodiment, the digital compass 41 is held at a proper position on the upper surface of the left lens tube 31 by the gimbal mechanism 42.

As the digital compass 41 there is used, e.g., compass IC utilizing the MI effect (Magneto-Impedance Effect) of amorphous material. Such a digital compass 41 is required to be used while being kept horizontal. When the telescopic system is tilted with respect to the horizontal line, the aforementioned compass IC is affected by the vertical component of terrestrial magnetism to cause some error in direction data.

The aforementioned gimbal mechanism 42 is provided to keep the digital compass 41 horizontal regardless of the tilt of the telescopic system.

The direction data obtained by the digital compass 41 is processed by an electronic circuit (not shown) provided in the binocular and then displayed on a display element (display unit) such as LCD. The display can be viewed together with an image of the object to be observed in the same field of view as that of the object to be observed. Such an optical arrangement that other data can be viewed together with an image of the object to be observed in the same field of view as that of the object to be observed has been heretofore known. Such an arrangement in the present embodiment can be sufficiently attained by the related art arrangement. Thus, this arrangement is not characteristic to the present application and thus will not be further described hereinafter.

The configuration of the gimbal mechanism 42 will be further described hereinafter in connection with FIGS. 2 to 4.

The gimbal mechanism 42 is formed by first and second gimbal suspension members 1, 2 and a base table side supporting material 3 as main constituents.

The base table side supporting member 3 is fixed to the binocular at a proper site, i.e., proper site on the upper surface of the left lens tube 31 in the present embodiment so as to rotatably support a first gimbal suspension member 1 described later (see FIG. 3).

The base table side supporting member 3 has a bottom side portion 3a fixed to the left lens tube 31 and supporting leaves 3b, 3c erected at both ends of the bottom side portion 3a parallel to each other in the direction perpendicular to the bottom side portion 3a.

The first gimbal suspension member 1 has two crossing arm members 1a, 1b. At the both ends of the arm portions 1a, 1b are provided first gimbal side engaging leaves 1c, 1d, 1e, 1f perpendicular to the arm portion 1a, 1b extending in the same direction (see FIGS. 3 and 4). For illustrative reasons, the first gimbal side engaging leaf 1e is not shown.

Figure 2:
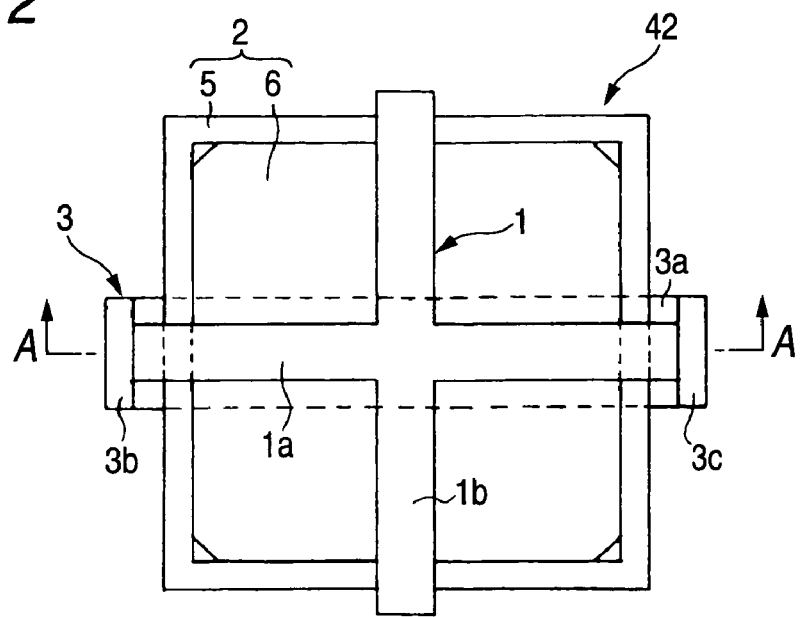
FIG. 2 is a plan view of a gimbal mechanism in the telescopic system with digital compass according to an exemplary embodiment of the invention.
Figure 3:
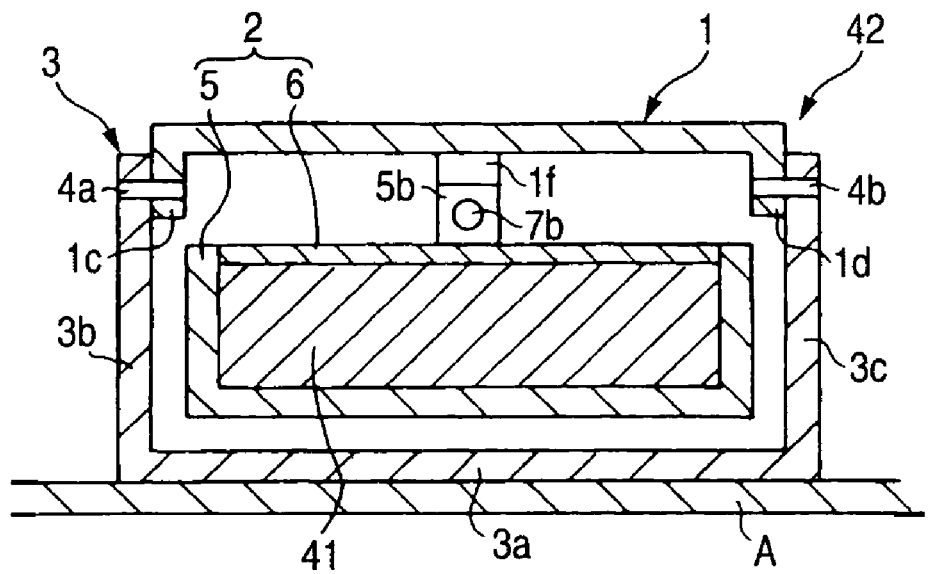
FIG. 3 is a sectional view taken on line A-A of FIG. 2.

The first gimbal suspension member 1 is arranged such that among the four first gimbal side engaging leaves 1c, 1d, 1e, 1f, the two first gimbal side engaging leaves 1c, 1d come in contact with a site on the supporting leaves 3b, 3c of the base side supporting member 3, respectively, in the vicinity of the end thereof and are suspended on the base table side supporting member 3 rotatably on first rotary shafts 4a, 4b extending through the shaft holes, respectively (see FIGS. 2 and 3).

The second gimbal suspension member 2 acts also as a case for receiving the digital compass 41 and is formed of a main body portion 5 having one opening portion the external shape of which is rectangular and a cover portion 6 attached to the main body 5 covering the opening portion of the main body 5.

The main body 5 has a receiving space formed therein in which the digital compass 41 is fixed received. The cover portion 6 is fixed to the opening portion by a proper means such as adhesive to close the opening portion. For convenience, the digital compass 41 is shown in shade in FIGS. 3 and 4.

At the center of the two opposing edges of the main body 5 on the opening side thereof are provided second gimbal side engaging leaves 5a, 5b, respectively, extending in the direction opposite the bottom of the main body 5 (see FIG. 3). In FIGS. 3 and 4, only one second gimbal side engaging leaf 5b is shown for illustrative reasons.

The second gimbal side engaging leaves 5a, 5b come in contact with the aforementioned first gimbal side engaging leaves 1e, 1f, respectively, and are suspended on the first gimbal suspension member 1 rotatably on second rotary shafts 7a, 7b extending through the shaft holes, respectively (see FIG. 3).

Accordingly, in this arrangement, when the entire gimbal mechanism 42 is tilted in such an arrangement that it swings about the first rotary shafts 4a, 4b, the first gimbal suspension member 1 swings about the first rotary shafts 4a, 4b according to the tilt until it stays in the same spatial position as did before the tilt of the gimbal mechanism 42.

Figure 4:
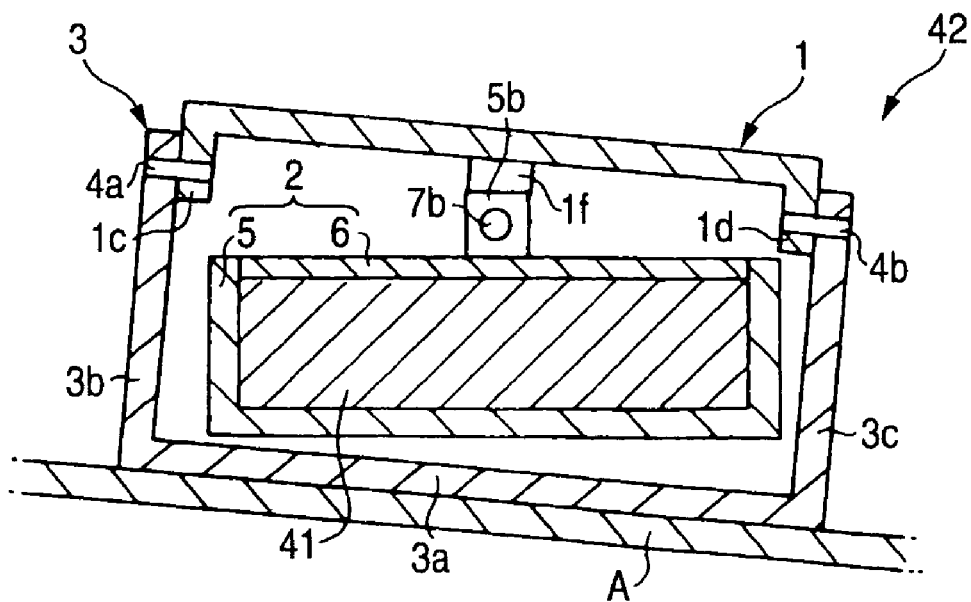
FIG. 4 is a longitudinal sectional view illustrating on line A-A of FIG. 2 the state developed when the gimbal mechanism shown in FIG. 2 is tilted such that it swings about the second rotary shaft.

Further, when the entire gimbal mechanism 42 is tilted in such a direction that it swings about the second rotary shafts 7a, 7b as shown in FIG. 4, the second gimbal suspension member 2 swings about the second rotary shafts 7a, 7b according to the tilt of the second gimbal mechanism suspension member 2 until it stays in the same position as did before the tilt of the gimbal mechanism 42. Accordingly, even when the base table side supporting member 3 is tilted with respect to the vertical direction, the second gimbal suspension member 2 is always kept horizontal (see FIG. 4).

Figure 5:
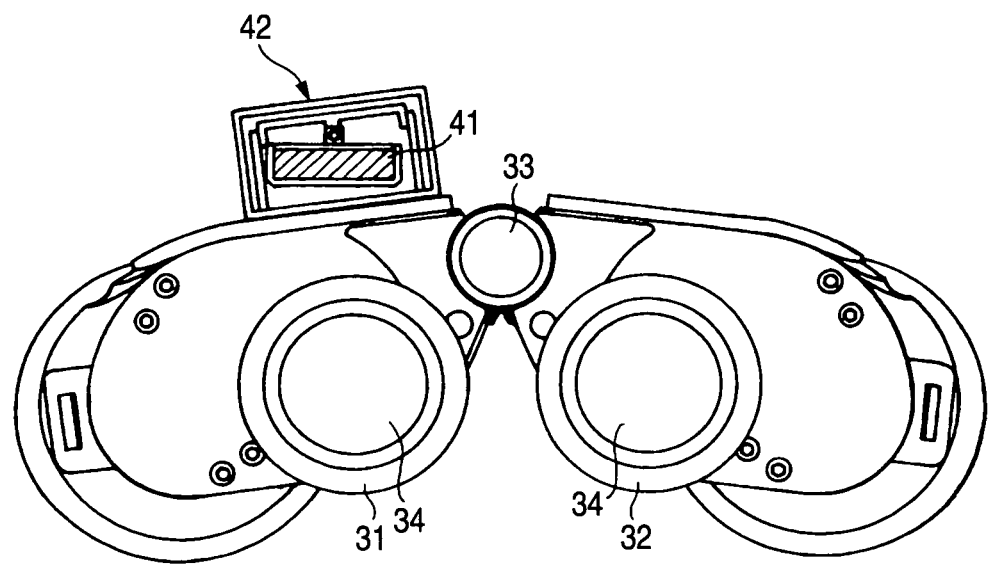
FIG. 5 is a diagrammatic view illustrating the state of the gimbal mechanism developed when the left lens tube swings counterclockwise about the axis and the right lens tube swings clockwise about the axis.
Figure 6:
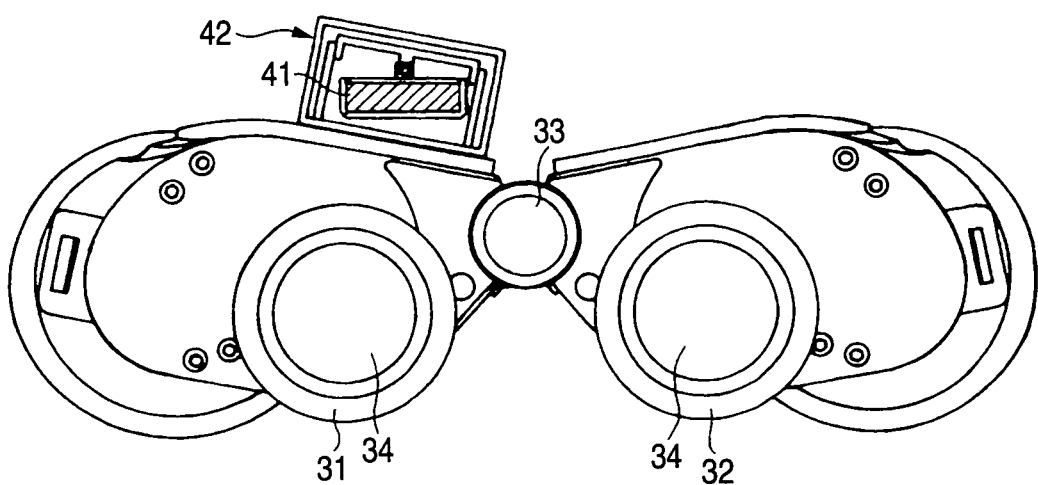
FIG. 6 is a diagrammatic view illustrating the state of the gimbal mechanism developed when the left lens tube swings clockwise about the axis and the right lens tube swings counterclockwise about the axis.

FIGS. 5 and 6 each give a diagrammatic illustration of the behavior of the digital compass 41 shown when the binocular is tilted. This example of tilt will be further described in connection with FIGS. 5 and 6. In FIGS. 5 and 6, the gimbal mechanism 42 is simply illustrated for ease of viewing.

Firstly, FIG. 5 depicts the left lens tube 31 which swings counterclockwise about the axis 33 and the right lens tube 32 which swings clockwise about the axis 33 as viewed from the ocular side thereof Supposing that the second rotary shafts 7a, 7b are attached to the left lens tube 31 parallel to the axis 33, when the gimbal mechanism 42 is tilted in the aforementioned manner, the second gimbal suspension member 2 swings about the second rotary shafts 7a, 7b according to the tilt of the gimbal mechanism 42 and tries to stay in the same position as did before the occurrence of tilt. As a result, the digital compass 41 is kept horizontal regardless of the tilt of the left lens tube 31 (see FIG. 5).

On the other hand, when the left lens tube 31 swings about the axis 33 clockwise and the right lens tube 32 swings about the axis 33 counterclockwise (see FIG. 6), the second gimbal suspension member 2 swings about the second rotary shafts 7a, 7b according to the tilt and tries to stay in the same state as did before the occurrence of tilt as in the aforementioned case. As a result, in this case, too, the digital compass 41 is kept horizontal regardless of the tilt of the left lens tube 31 (see FIG. 6).

A modification of the gimbal mechanism will be described in connection with FIGS. 7 to 9.

Where the constituents are the same as shown in FIGS. 2 to 4, the same numerals are used and they will not be further described hereinafter. The modification will be described hereinafter focusing different points.

Figure 7:
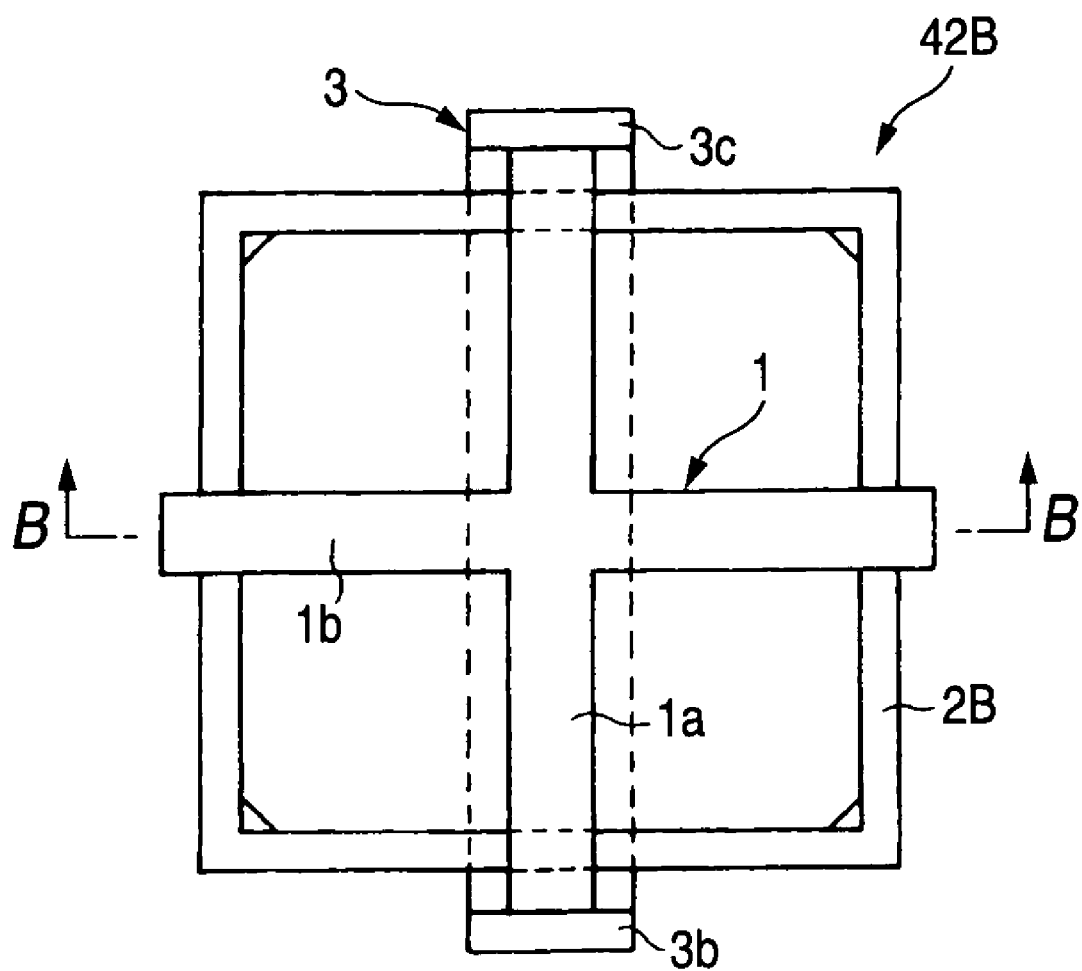
FIG. 7 is a plan view illustrating a modification of the gimbal mechanism shown in FIG. 2.
Figure 8:
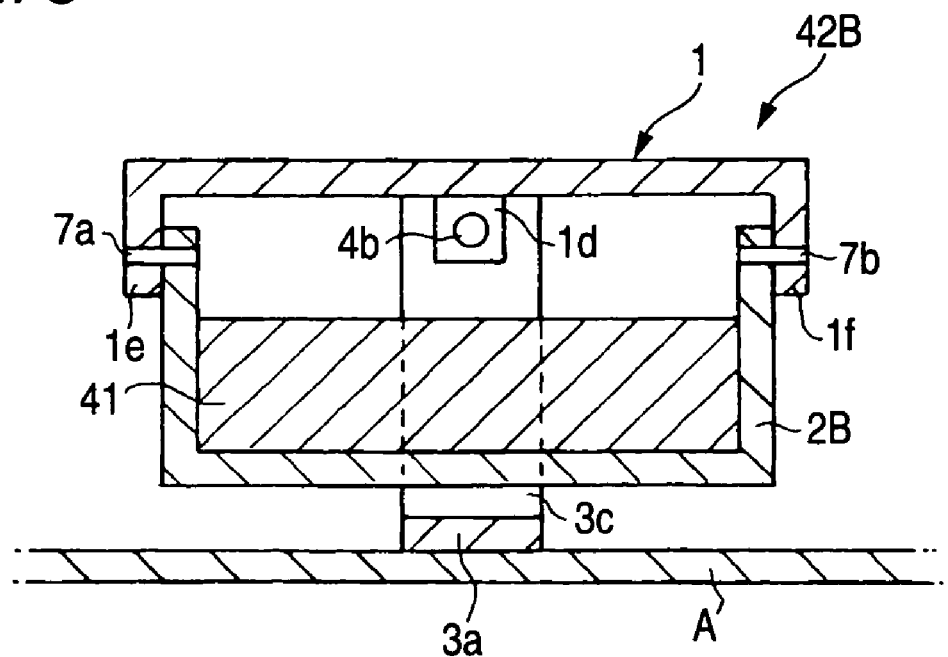
FIG. 8 is a longitudinal sectional view taken on line A-A of FIG. 7.
Figure 9:
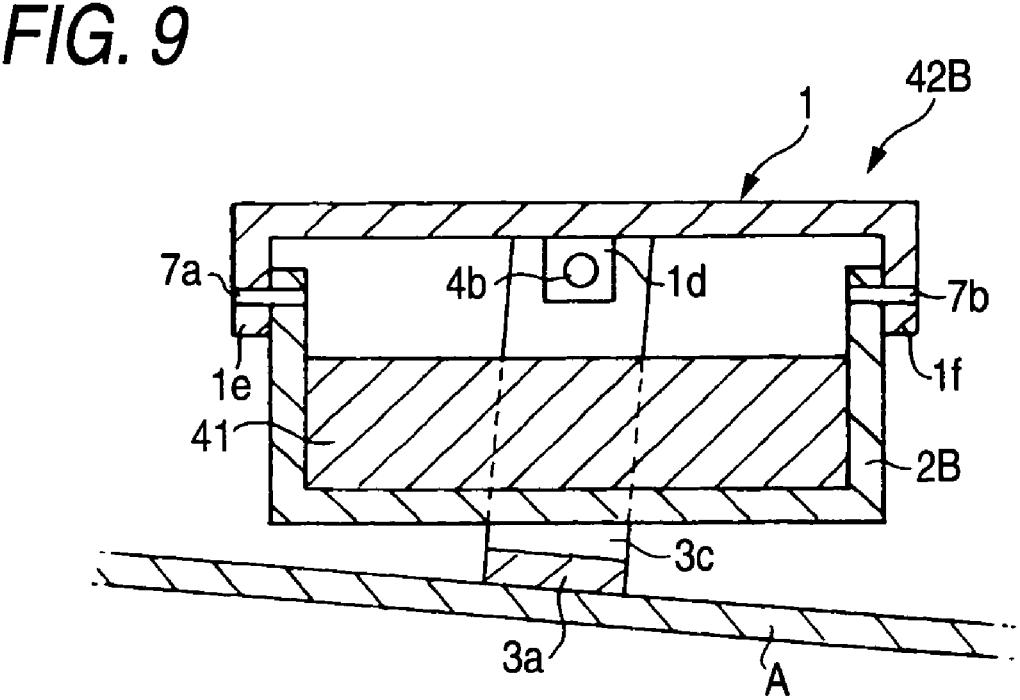
FIG. 9 is a longitudinal sectional view illustrating on line B-B of FIG. 7 the state developed when the gimbal mechanism shown in FIG. 7 is tilted such that it swings about the second rotary shaft.
Figure 10:
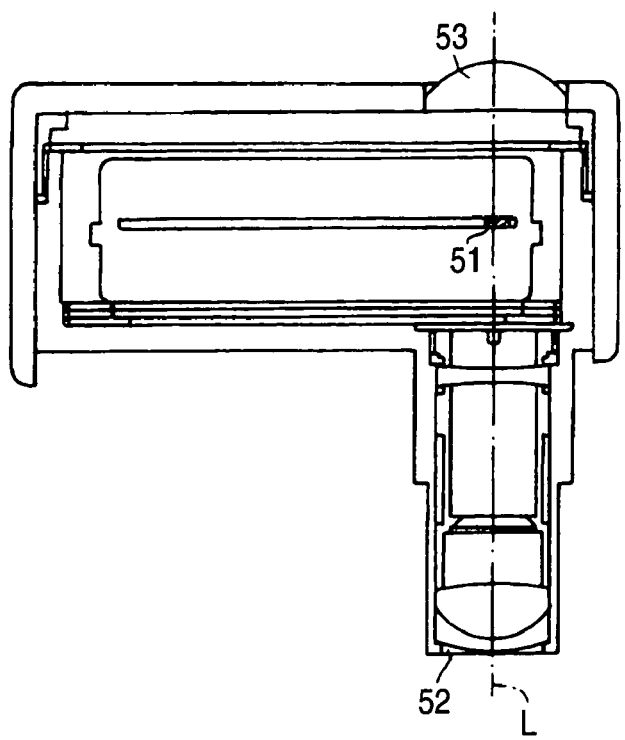
FIG. 10 is a schematic diagram illustrating an essence of a binocular having a related magnet plate.
Figure 11:
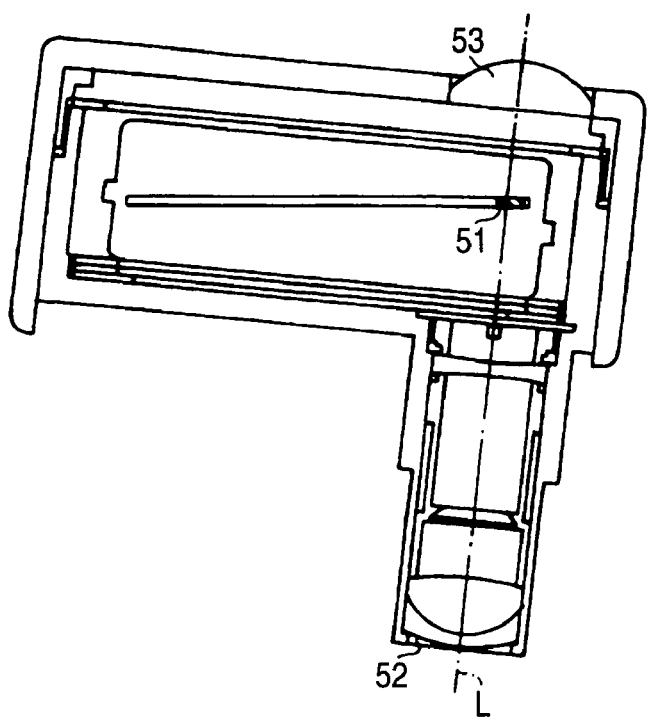
FIG. 11 is a schematic diagram illustrating the state of the magnet plate developed when the binocular having the related art magnetic plate is tilted.

The gimbal mechanism 42B in this modification is formed of first and second gimbal suspension members 1, 2B and a base table side supporting member 3 as main constituents (see FIGS. 7 and 8). The basic configuration of the gimbal mechanism 42B is the same as that of the aforementioned gimbal mechanism.

The base table side supporting member 3 and the first gimbal suspension member 1 are essentially the same as the aforementioned constitution. In other words, the first gimbal suspension member 1 has one set of two opposing first gimbal side engaging leaves 1c, 1d in contact with a site on the supporting leaves 3b, 3c of the base side supporting member 3, respectively, in the vicinity of the end thereof Since the first rotary shafts 4a, 4b extend through the supporting leaves 3b, 3c, respectively, at the contact site, the first gimbal suspension member 1 is suspended on the base table side supporting member 3 rotatably on the first rotary shafts 4a, 4b (see FIG. 8). For illustrative reasons, only one first gimbal side engaging leaf 1d is shown.

The second gimbal suspension member 2B has one opening portion and a rectangular external shape and is arranged to receive the digital compass 41 therein (see FIG. 8).

The second gimbal suspension member 2B has two first gimbal mechanism side engaging leaves 1e, 1f of the first gimbal suspension member 1 in contact with the surface of the central part of the two opposing edges on the opening portion side thereof in the vicinity of the end thereof Second rotary shafts 7a, 7b extend through the respective member at the contact site. In this arrangement, the second gimbal suspension member 2B is suspended on the first gimbal suspension member 1 rotatably on the second rotary shafts 7a, 7b (see FIG. 8).

The movement of the gimbal mechanism 42B in such an arrangement on the first rotary shafts 4a, 4b and the second rotary shafts 7a, 7b is not essentially different from that of the aforementioned gimbal mechanism 42 and thus will not be further described hereinafter. FIG. 9 depicts how the gimbal mechanism 42B behaves when it swings about the second rotary shafts 7a, 7b. The state shown in FIG. 9 will be briefly described hereinafter.

When the gimbal mechanism 42B is tilted such that it swings about the second rotary shafts 7a, 7b, the first gimbal suspension member 1 swings about the second rotary shafts 7a, 7b in such a manner that the state before tilt can be maintained. In this case, the second gimbal suspension member 2B swings integrally with the first gimbal suspension member 1. As a result, the digital compass 41 received in the second gimbal suspension member 2B can be kept horizontal regardless of the tilt of the entire gimbal mechanism 42B (see FIG. 9).

While the embodiment of the invention has been described with reference to binocular by way of example, the present application doesn't need to be limited to binocular. It goes without saying that the invention can be applied also to monocle.

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application No. JP2005-102342, filed Mar. 31, 2005, the contents of which is incorporated herein by reference.

What is claimed is:

1. A telescopic system comprising:
   a telescopic system housing including a lens tube;
   a digital compass, the telescopic system being capable of displaying a direction obtained by the digital compass on a display unit; and
   a gimbal mechanism comprising a gimbal suspension unit, the gimbal suspension unit holding the digital compass, wherein
   the gimbal suspension unit comprises:
      a first gimbal suspension member, and
      a second gimbal suspension member that includes a main body having a rectangular opening portion, a receiving space within the main body, the digital compass fixed in the receiving space, and a cover portion adhesively attached to the main body and covering the opening portion,
   the gimbal mechanism further comprises:
      a first rotary shaft, and
      a second rotary shaft perpendicular to the first rotary shaft,
   the first gimbal suspension member is suspended on a member fixed to an upper surface of the telescopic system housing including the lens tube so as to rotate on the first rotary shaft, and
   the second gimbal suspension member is suspended on the first gimbal suspension member so as to rotate on the second rotary shaft.

* * * * *